United States Patent
Tyers et al.

(10) Patent No.: US 11,042,627 B2
(45) Date of Patent: Jun. 22, 2021

(54) SYSTEM AND METHOD FOR IMPLEMENTING KEYBOARD LINKED AUTHENTICATION CHALLENGES

(71) Applicant: PayPal, Inc., San Jose, CA (US)

(72) Inventors: Kevin Tyers, Chandler, AZ (US); Blake Butler, Scottsdale, AZ (US); Nathan Robert Pratt, Scottsdale, AZ (US); Bradley Wardman, Phoenix, AZ (US)

(73) Assignee: PayPal, Inc., San Jose, CA (US)

( * ) Notice: Subject to any disclaimer, the term of this patent is extended or adjusted under 35 U.S.C. 154(b) by 271 days.

(21) Appl. No.: 16/023,986

(22) Filed: Jun. 29, 2018

(65) Prior Publication Data
US 2020/0004949 A1      Jan. 2, 2020

(51) Int. Cl.
*G06F 21/36* (2013.01)
*G06F 21/31* (2013.01)
*G06F 3/02* (2006.01)

(52) U.S. Cl.
CPC .......... *G06F 21/36* (2013.01); *G06F 3/02* (2013.01); *G06F 21/316* (2013.01); *G06F 2221/2103* (2013.01); *G06F 2221/2133* (2013.01)

(58) Field of Classification Search
CPC .... G06F 21/36; G06F 3/02; G06F 2221/2103; G06F 2221/2133
See application file for complete search history.

(56) References Cited

U.S. PATENT DOCUMENTS

| | | | | |
|---|---|---|---|---|
| 10,235,507 | B1* | 3/2019 | Rome | G06F 21/46 |
| 2006/0271790 | A1* | 11/2006 | Chen | G06F 21/32 |
| | | | | 713/185 |
| 2010/0058479 | A1* | 3/2010 | Chen | G06F 21/83 |
| | | | | 726/26 |
| 2010/0146619 | A1* | 6/2010 | Chen | G06F 21/32 |
| | | | | 726/19 |
| 2011/0185416 | A1* | 7/2011 | Wolfl | G06F 21/32 |
| | | | | 726/16 |
| 2012/0098750 | A1* | 4/2012 | Allen | G06F 3/023 |
| | | | | 345/169 |
| 2012/0246707 | A1* | 9/2012 | Wu | G06F 21/316 |
| | | | | 726/7 |
| 2014/0173286 | A1* | 6/2014 | Novak | G06F 21/316 |
| | | | | 713/176 |
| 2015/0169861 | A1* | 6/2015 | Feltham | G06F 21/36 |
| | | | | 726/19 |

(Continued)

*Primary Examiner* — Hee K Song
(74) *Attorney, Agent, or Firm* — Haynes and Boone, LLP

(57) ABSTRACT

Methods and systems for implementing keyboard linked authentication challenges are described. A visual representation of a first string of characters is provided for display on a client computing device. In response to the providing the visual representation for display, several keystrokes on the client computing device that produces a second string of characters are received. A determination that the second string of characters matches the first string of characters is made. A determination that no unauthorized keystrokes are included in the detected plurality of keystrokes is further made. Access is provided to the client computing device upon determining that the second string of characters matches the first string of characters, and determining that no unauthorized keystrokes are included in the detected plurality of keystrokes.

20 Claims, 5 Drawing Sheets

(56) References Cited

U.S. PATENT DOCUMENTS

2016/0042175 A1\* 2/2016 Boodaei ................. G06F 21/83
                                                              726/22
2017/0091450 A1\* 3/2017 Turgeman ............. G06F 21/554

\* cited by examiner

SYSTEM AND METHOD FOR IMPLEMENTING KEYBOARD LINKED AUTHENTICATION CHALLENGES

TECHNICAL FIELD

The subject technology generally relates to authentication challenges, and more particularly, relates to a system and method for performing authentication by monitoring keystrokes on a keyboard.

BACKGROUND

As the volume of sensitivity of information stored and transacted over the internet continues to increase, the need to protect user accounts becomes all the more critical. Various measures to defend against attacks continue to be developed in an effort to improve the security of these accounts. However, bad actors have become more sophisticated, and thus, have developed work-arounds to many of these measures. As such, more creative defenses for protecting against bad actors must be implemented. Accordingly, a method for determining the legitimacy of a client login attempt by monitoring keystrokes entered into a client device may help mitigate infiltration attempts by bad actors. More specifically, the context of the keystrokes may provide information on the user of the client device.

SUMMARY

According to various aspects of the subject technology, a system for implementing keyboard linked authentication challenges is described. A visual representation of a first string of characters is provided for display on a client computing device. In response to the providing the visual representation for display, several keystrokes on the client computing device that produces a second string of characters are received. A determination that the second string of characters matches the first string of characters is made. A determination that no unauthorized keystrokes are included in the detected several keystrokes is further made. Access is provided to the client computing device upon determining that the second string of characters matches the first string of characters, and determining that no unauthorized keystrokes are included in the detected several keystrokes.

According to various aspects of the subject technology, a method for implementing keyboard linked authentication challenges is described. In response to a log in prompt, several keystrokes are detected from the client computing device that produces a first string of characters corresponding to a username and a second string of characters corresponding to a password. The first and second strings of characters are authenticated. A determination that no unauthorized keystrokes are included in the detected several keystrokes is made. Access is provided to the client computing device upon authenticating the first and second strings of characters, and determining that no unauthorized keystrokes are included in the detected several keystrokes.

According to various aspects of the subject technology, a non-transitory machine-readable medium having stored thereon machine-readable instructions executable to determine the legitimacy of a log in attempt based on keystroke data is described. A visual representation of a first string of characters is provided for display on a client computing device. In response to the providing the visual representation for display, several keystrokes on the client computing device that produces a second string of characters are received. A determination that the second string of characters matches the first string of characters is made. A determination that no unauthorized keystrokes are included in the detected several keystrokes is further made. Access is provided to the client computing device upon determining that the second string of characters matches the first string of characters, and determining that no unauthorized keystrokes are included in the detected several keystrokes.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
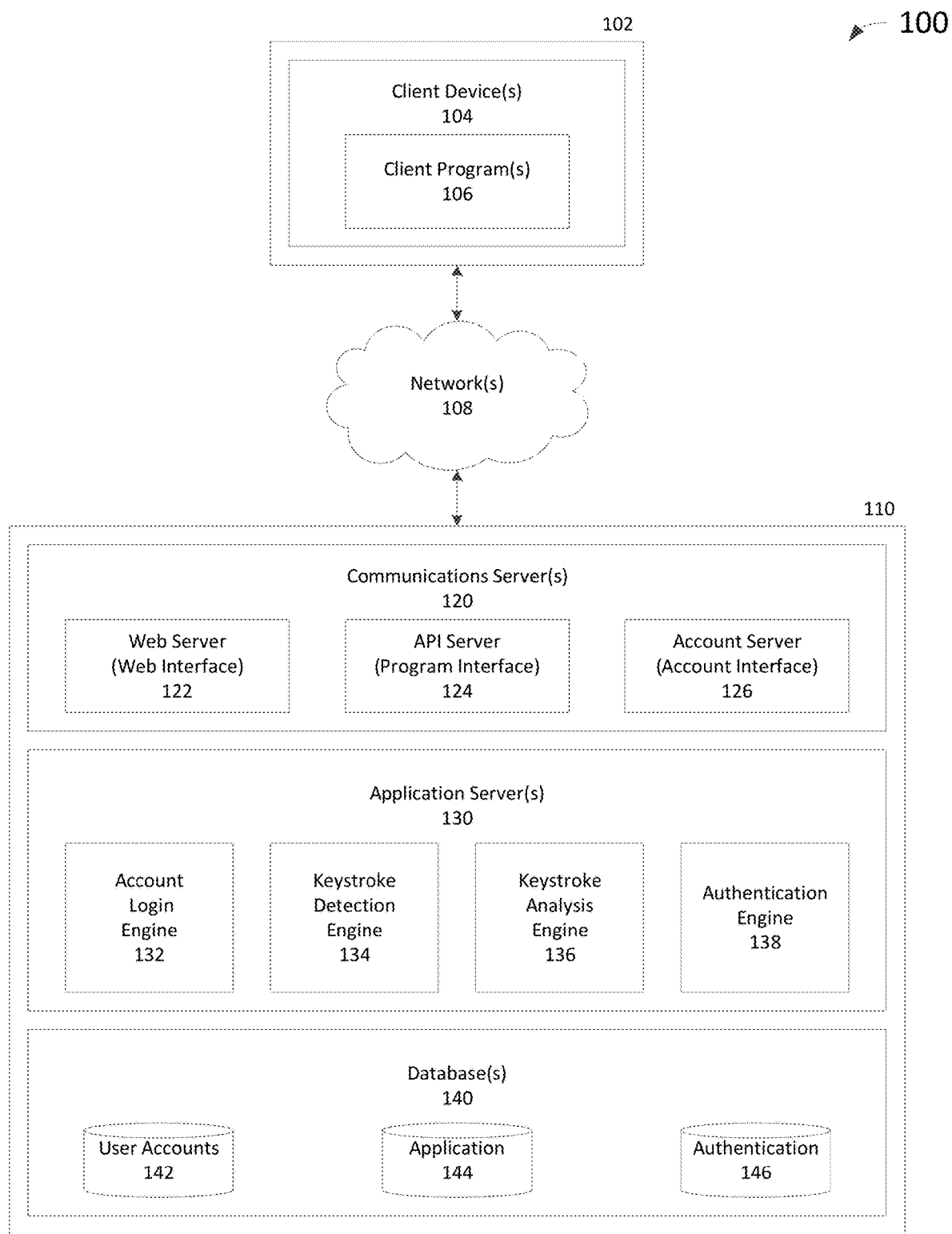
FIG. 1 is a block diagram of an exemplary computing system on which user authentication based on keystroke data is implemented.

Personal electronic devices (e.g., smartphones, desktops, tablets, laptops, etc.) are used for a variety of purposes including but not limited to real-time communications, financial transactions, and the transmission of or sharing of data. For these activities to be properly conducted, a user must be authenticated to ensure that the user is who the user claims to be. Numerous applications are provided for users to connect to their accounts which contain sensitive information (e.g., personal information, financial information, etc.). As a result, these applications that serve as gateways to sensitive information become targets for unscrupulous activity.

One common technique employed by hackers is the account takeover, where hackers use illicitly obtained credentials to log into accounts of other users and access information of the other users without authorization. Once a user's credentials are acquired (e.g. through phishing, malware, database breaches, etc.), the hacker may enter the credential in a log in screen to take over a user's account without the user knowing. The location from which the hackers attempt the log ins with these stolen credentials are usually nowhere near the actual owner of the account, and oftentimes in a different country that may use a different style keyboard. As such, if presented a string of characters to enter as a challenge, the hacker may properly enter the characters, but may do so using keystrokes different from that which the actual owner of the account would use. Additionally, since some of the characters of the challenge may be obscure to the hacker because of geography/language differences, it may take the hacker additional time to enter the characters presented by the challenge. In other words, the hacker may enter it with a different cadence than the actual owner because the hacker first needs to figure out how to type the character. Accordingly, keystroke data of a response to a challenge may provide an indication of the legitimacy of a user attempting to log in to a user account from a client computing device, especially those not known to be associated with the account.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

FIG. 1 is a block diagram of an exemplary computing system on which a determination of the legitimacy of a log in attempt based on keystroke data may be performed. As shown, a computing system 100 may comprise or implement a aa of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or an account server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or an account interface provided by account server 126. It may be appreciated that web server 122, API server 124, and account server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Account server 126 may be arranged to communicate with various account clients and/or applications and may provide an account interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include an account login engine 132, keystroke detection engine 134, keystroke analysis engine 136, and/or authentication engine 138. These servers and/or components, which may be in addition to other servers, may be structured and arranged to analyze those accounts that may be subject to malicious activity.

Application servers 130, in turn, may be coupled to and capable of accessing one or more databases 140 including user accounts database 142, application database 144, and/or authentication database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
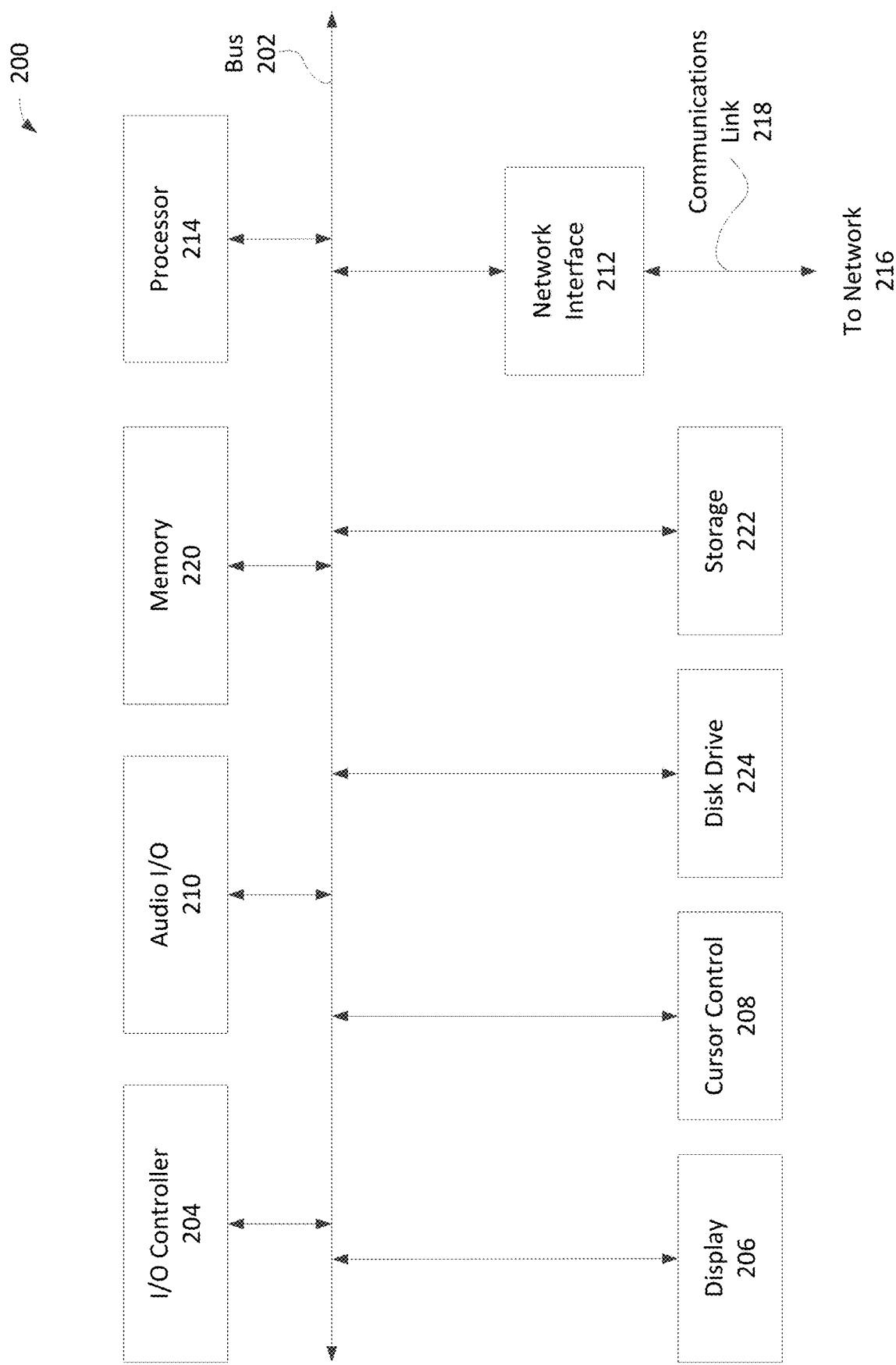
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
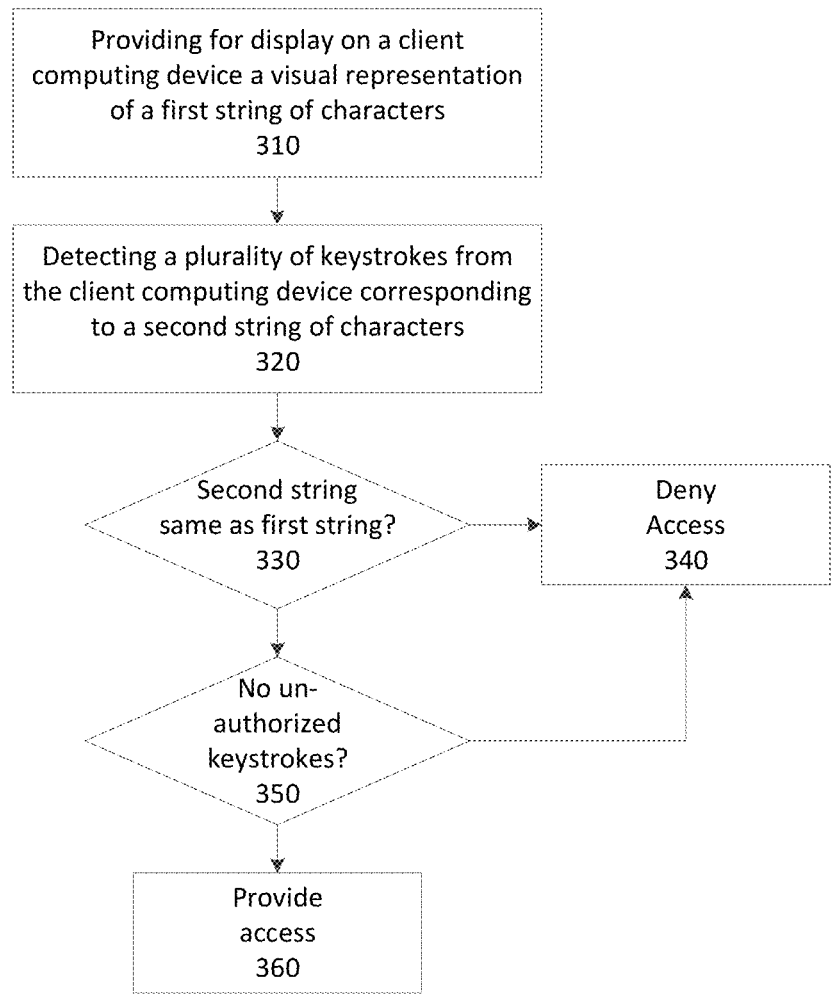
FIG. 3 illustrates an exemplary process 300 for authenticating a user based on keystroke data.

One strategy that may be employed to defend against account takeovers is to prevent a suspected bad actor from logging into the account even if the bad actor possesses the proper credentials (i.e., illicitly obtained credentials). To deny a bad actor from logging in, the system may present a user with a challenge to type a string of characters. FIG. 3 illustrates an exemplary process 300 for authenticating a user based on keystroke data. In an exemplary embodiment, when a login session is initiated on the system, the account login engine 132 provides for display on a client computing device a visual representation of a first string of characters in step 310. The system may choose the string of characters based on what the system expects to be present on an input device (i.e., a keyboard) associated with the user's location or their account settings (e.g. home address, citizenship, etc.). For example, the "£" character may be included in the string of characters when the system determines that the log in attempt should originate from the United Kingdom ("U.K."). That is, the system may present the "£" character in the challenge because the system expects the user to be using an ISO keyboard. The "£" character is particularly useful in this case because while "£" is easily entered on an ISO keyboard, it is less commonly used in other regions (e.g., the United States) that have adopted the ANSI keyboard that require a different set of keystrokes.

In step 320, a plurality of keystrokes is detected from the client computing device, where the detected keystrokes correspond to a second string of characters. As discussed above, "£" may be presented as an example challenge character. In response, a user in the U.K. using an ISO keyboard would simply enter the keystroke combination of Shift+3 to produce the "£" character. The "£" character is not as easily generated, however, with an ANSI keyboard. In order to produce the "£" character on an ANSI keyboard, the user would be required to enter the keystroke combination of Alt+156 or use some alternative function (e.g., copy and paste). In some cases, the user may not even possess the knowledge that Alt+156 produces a "£" character. However, if the user was knowledgeable of the keystroke combination, the system can easily distinguish that the "£" character was entered via an ANSI keyboard as opposed to an ISO keyboard.

In step 330, a determination that the second string of characters matches the first string of characters is made. If a user enters a wrong challenge response (i.e., what the user types does not match the string of characters presented in the challenge), access is denied in step 340. However, if the first and second string of characters are a match, a further determination that no unauthorized keystrokes are included in the plurality of received keystrokes is made in step 350. As indicated above, Alt+156 will produce the "£" character on an ANSI keyboard, whereas on an ISO keyboard, the "£" character can be typed out simply as a Shift+3 combination of keystrokes. Since countries that utilize the "£" character typically use ISO keyboards, the expected combination of keystrokes is Shift+3 and not Alt+156. Accordingly, Alt+156 may be considered unauthorized keystrokes associated with the "£" character.

When no unauthorized keystrokes are detected as being used to produce the second string of characters, the user is provided access in step 360. In other words, the user gains access not simply by typing the matching characters, but the user must also type it with an expected set of keystrokes (i.e., the keystrokes do not include any unauthorized keystrokes). Otherwise, access may be denied in step 340 if unauthorized keystrokes are in fact detected. In some embodiments, the detection of unauthorized keystrokes may raise the risk score associated with the user, and may not result in a denial of service until that risk score exceeds a predetermined risk level.

Figure 4:
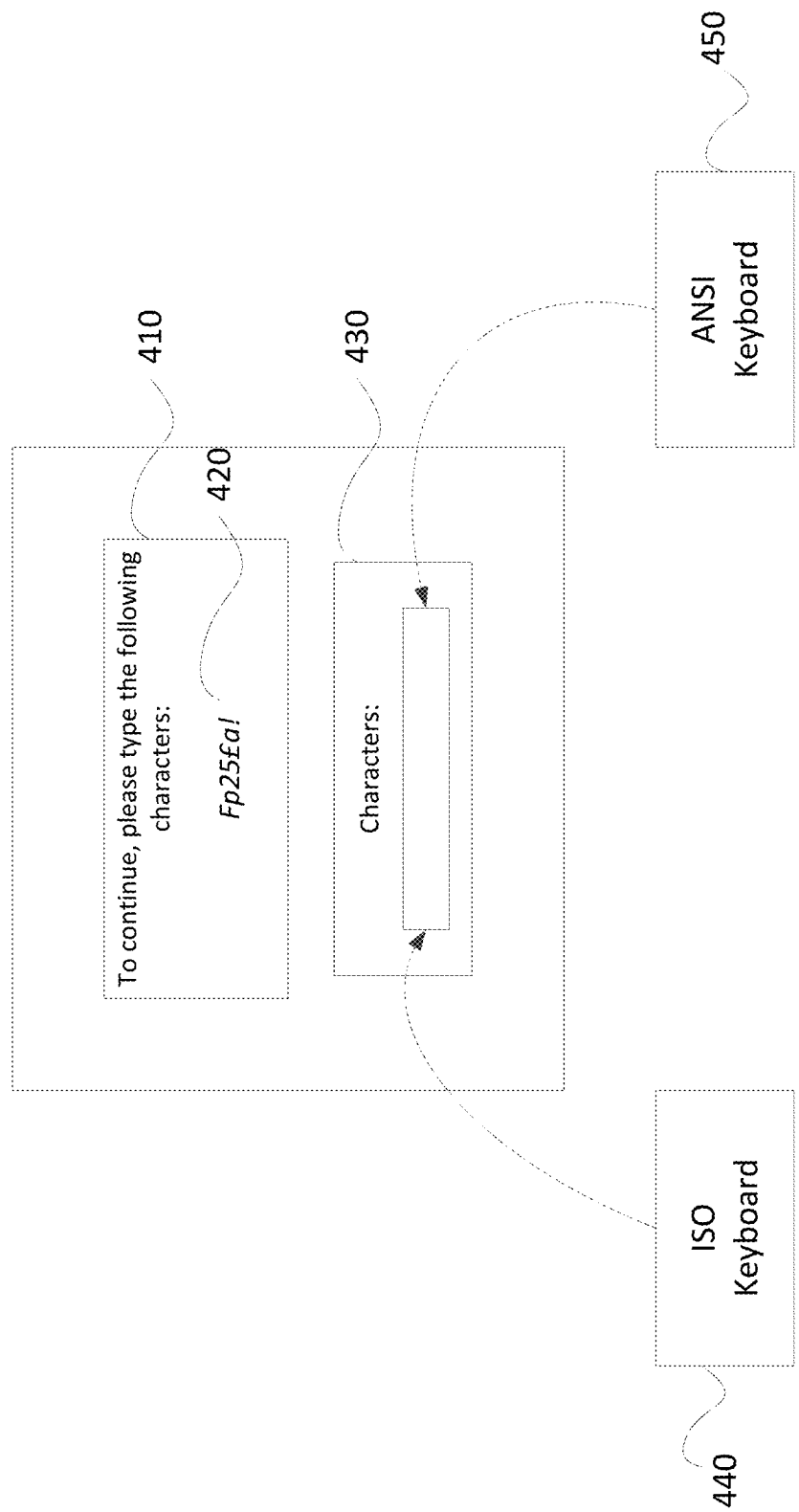
FIG. 4 illustrates a graphical user interface for performing the authentication based on keystroke data.

FIG. 4 illustrates a graphical user interface for performing the authentication based on keystroke data. In a preferred embodiment, a challenge 410 is presented to a user on a client computing device. The challenge 410 includes a string of characters 420, and instructions prompting the user to type the string of characters 420 in an entry box 430. Depending on the type of keyboard utilized by the user to respond to the challenge, different keystrokes may be entered. In some instances, different users may use different keystrokes despite having the same style keyboard.

In this example, the string of text 420 is presented as "Fp25£a!" by the system. Using an ISO keyboard 440, a user can type out the challenge string of characters with the following keystrokes:

Shift+F, P, 2, 5, Shift+3, and A.

Using an ANSI keyboard, on the hand, would require the following keystrokes:

Shift+F, P, 2, 5, Alt+156, and A.

In some instances, a user may even use a copy and paste function. Such functions are generally keyboard agnostic, as the keystrokes required are basic/universal keys. For example, the keystrokes would be as follows:

Ctrl+C (or Ctrl+X) and Ctrl+V, or
Ctrl+V

The same copy and paste input could alternatively be performed as a mouse or touchpad function, where the copy and paste commands are selected from a dropdown menu after a right click command.

The different variations in keystrokes to produce the string of text in response to the challenge can provide certain data about the user attempting to log in. For example, the keystrokes may provide an indication as to which regions of the world the user may be from. For example, users that can type the "£" character with just Shift+3 are presumed to be located in areas that utilize ISO keyboards. Conversely, users that use Alt+156 or copy and paste functions are not likely to be in a region where ISO keyboards are used. By presenting characters that are keyboard/region specific, the system may be able to make a determination as to confirm or deny a log in attempt by a user. While this exemplary embodiment describes a challenge that requires the "£" character to be entered, one of ordinary skill in the art may appreciate that several different region/keyboard type specific characters may be incorporated into the challenge.

In some embodiments, a database may be provided that maintains a list of the unauthorized keystrokes. For example, any combination of keystrokes that includes the Alt button can be considered unauthorized simply because the Alt button is not normally used to type a character. More specifically, the challenge, which will be presented based on what the system expects to be present on an input device such as a keyboard. So if the system expects an ISO keyboard to be used, presenting the "£" character in the challenge would pose no issues for users of ISO keyboard. Conversely, if the system expects an ANSI keyboard to be used, the system would not present the "£" character in the challenge, as the "£" character would be difficult to produce on an ANSI keyboard.

The database may also include keys such as the Ctrl key in the list of unauthorized keystrokes. Similar to the Alt key, the Ctrl key has minimal functionality for typing out text. Instead, the Ctrl key is used in conjunction to other keys to perform functions, such as cutting and pasting. Since the system may not be able to distinguish these functions as coming from an ISO or and ANSI keyboard, the use of these functions should not be permitted in responses to the challenge. Instead, the user will have to type out the characters in order to obtain access.

In some embodiments, the database may also include a list of unauthorized cursor functions. As described above, the copy and paste function may be performed using a mouse or touchpad. For example, the user may highlight a string of text, right click for a dropdown menu to perform the copy function, move the cursor to the entry box, and right click again for the dropdown menu to perform the paste. The results are similar to using Ctrl+C and Ctrl V in that the user does not enter keystrokes that provide additional context suggesting a keyboard type, and thus, a geographic location. As such, these types of cursor functions should also be considered unauthorized and result in an elevated risk score and/or a denial of access.

Figure 5:
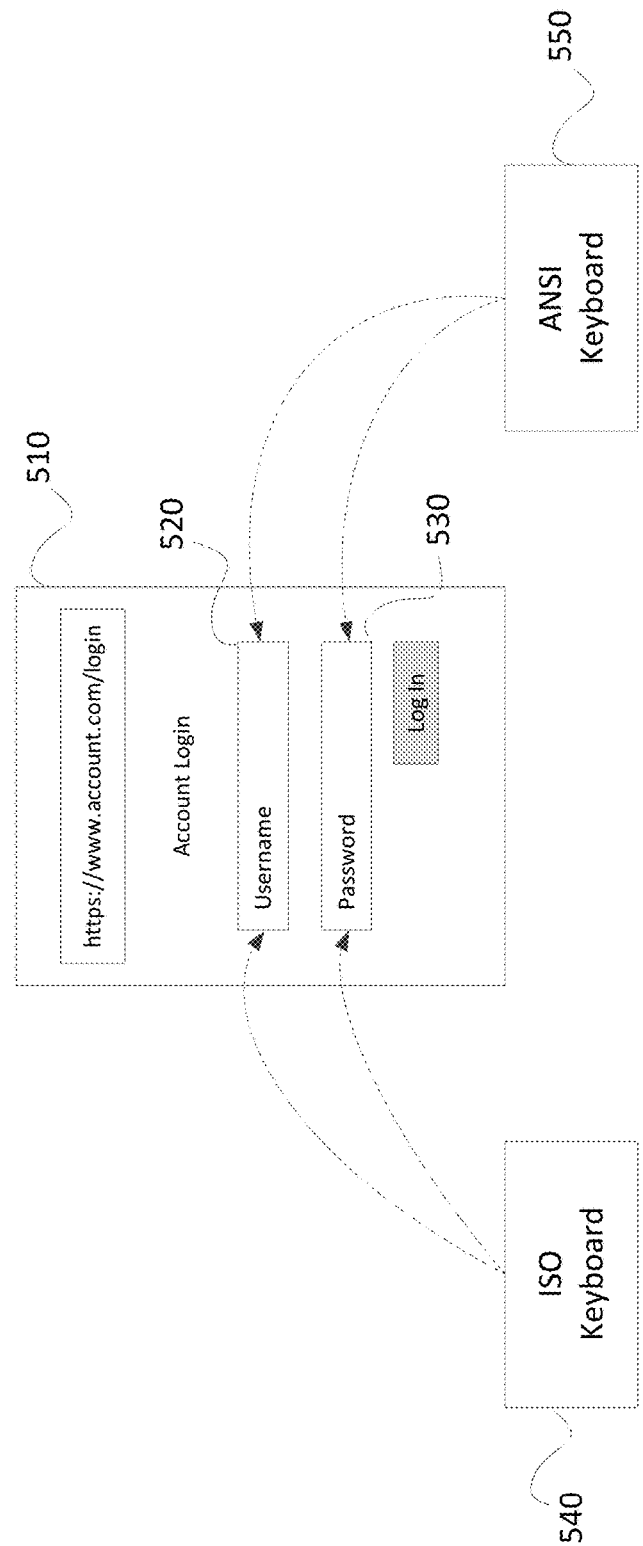
FIG. 5 illustrates a graphical user interface for performing the authentication based on keystroke data in an alternative embodiment.

FIG. 5 illustrates a graphical user interface for performing the authentication based on keystroke data in an alternative embodiment. In this embodiment, rather than providing a challenge for the user to fulfill, keystrokes are instead tracked at the time when the user enters credential information at a login screen 510. For example, the user may enter his credentials into a username box 520 and a password box 530. The expectation of the system with regards to input devices (e.g., keyboards) that are to be used may be based on the user's account, and more specifically, historical data of the user. For example, for a user who is known to log in with an ISO keyboard 540 (i.e., based on historical data), detection of a keystroke combination that includes Alt+156 instead of Shift+3 for the "£" character may raise a red flag. The presumption is that the user would not incorporate the "£" character into a username or password if it requires four keystrokes on an ANSI keyboard 550. As such, access may be denied even if the proper credentials are provided.

In addition to the detection of the actual keystrokes, the system may also monitor the cadence at which the keystrokes are being input. Typically, the entry of username-password pairs is second nature to a user. As such, the cadence at which the username and password is entered will naturally be quick and uninterrupted. If, however, a bad actor is to have gotten hold of a user's credential, the entry by the bad actor would not necessarily be at the same cadence. For one, the bad actor would be cautious as not to make any mistakes. Additionally, the username and password may not be familiar to the bad actor. Accordingly, the system can, in some instances, distinguish different users based on the cadence of typing. That is, a slower cadence can be presumed to be a bad actor, whereas a quicker cadence (i.e., a cadence above a pre-established threshold) would suggest a legitimate user. While cadence is described here in reference to keystrokes of credential entry, similar cadence rules may be applied to the response to the challenge described above. It is expected that a user having the proper keyboard would be able to enter the string of text with more facility than that of a person using an alternate style keyboard.

In some instances, certain user accounts may require specific special characters for usernames and/or passwords. The requirement can be based on the expected keyboard being used by the account owner. By requiring a character such as "£" for a username and/or password for a user in the U.K. would make sense because if a bad actor steals the account owner's credentials, the attempted infiltration would be detectable based on the detection of unauthorized keystrokes as discussed above. The special character may vary depending on language, location and other characteristics.

In some embodiments, a measure of time to complete may also be used to distinguish legitimate users from bad actors. This feature is similar to the cadence feature except that it examines the duration from start to stop of an entry of the challenge response or user credentials. Like the cadence feature, a greater familiarity with a string of text or username and password, the shorter the time to complete should be. As such, the system may set a threshold time to complete that if exceeded, will provide an indication of a potential bad actor. This threshold duration may be set based on historical data (e.g., how long does it take an average user to enter the string of text with the proper keyboard, or how fast does the user typically enter his username-password pair).

In order to track keystrokes, the system may employ Javascript. Using native functions, such as onkeydown, the input will be captured and available for analysis. The function onkeydown returns a KeyboardEvent object. This object contains useful properties such as altKey (which detects if the Alt key was pressed at the time of the key event), ctrlKey, shiftKey, key, and keyCode. Based on these attributes, it can be inferred if the user is using the expected keyboard.

While the above description mentions ISO and ANSI keyboards, one of ordinary skill in the art can appreciate that system may be adapted to be used with additional varieties of keyboards. The variations include but are not limited to Apple's© proprietary keyboard that have keys that are different from both ISO and ANSI keyboards, different versions of the ISO and ANSI keyboards that are adapted for specialty use (e.g., for laptops with limited space), and tablets that provide keyboards on the display screen with unique layouts. Additionally, ISO and ANSI keyboards have various layout versions. In the example above, the keyboard where Shift+3 produces the "£" character is a U.K. keyboard layout, whereas the keyboard where Shift+3 produces the "#" character is a U.S. layout. Additionally, dialects may be implemented on keyboards configuring software settings so that characters that are region specific may be represented. For example, some keyboards are set to accept diacritic or accent, while others are not. Thus, by knowing the type of keyboard being used, and the layout setting selected, the system may be able to properly identify whether characters entered are authorized or not.

The user device (i.e., the client computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for securing access to an account comprising:
a non-transitory memory storing instructions; and
one or more hardware processors coupled to the non-transitory memory and configured to read the instructions from the non-transitory memory to cause the system to perform operations comprising:
providing for display on a client computing device a visual representation of a first string of characters;
detecting, in response to the providing the visual representation for display, a plurality of keystrokes on the client computing device that produces a second string of characters;
determining that the second string of characters matches the first string of characters;
determining that no unauthorized keystrokes are included in the plurality of keystrokes based at least in part on keystroke data including a code associated with each keystroke of the plurality of keystrokes, wherein the unauthorized keystrokes include keystrokes not included in an expected combination of keystrokes associated with the first string of characters; and
providing access to the client computing device upon determining that the second string of characters matches the first string of characters and determining that no unauthorized keystrokes are included in the plurality of keystrokes.

2. The system of claim 1, wherein the first string of characters is generated based on an expectation of an input device on the client computing device.

3. The system of claim 2, wherein the input device is one of an ISO keyboard or an ANSI keyboard.

4. The system of claim 1, wherein the plurality of keystrokes is detected using Javascript.

5. The system of claim 1, wherein the operations further comprise:
   determining a cadence of the plurality of keystrokes; and
   determining that the cadence of the plurality of keystrokes is above a predetermined threshold cadence,
   wherein access is provided to the client computing device further upon determining that the cadence of the plurality of keystrokes is above the predetermined threshold cadence.

6. The system of claim 1, wherein the operations further comprise:
   measuring a time of completion of the plurality of keystrokes; and
   determining that the time of completion of the plurality of keystrokes is below a predetermined threshold time of completion,
   wherein access is provided to the client computing device further upon determining that the time of completion of the plurality of keystrokes is below the predetermined threshold time of completion.

7. The system of claim 3, wherein a list of the unauthorized keystrokes is maintained in a database.

8. The system of claim 7, wherein the unauthorized keystrokes are determined for one of the ISO keyboard or the ANSI keyboard.

9. A method for enhancing security for log in sessions, the method comprising:
   detecting, in response to a log in prompt, a plurality of keystrokes on a client computing device that produces a first string of characters corresponding to a username and a second string of characters corresponding to a password;
   authenticating the first and second strings of characters;
   determining that no unauthorized keystrokes are included in the plurality of keystrokes based at least in part on keystroke data including a code associated with each keystroke of the plurality of keystrokes, wherein the unauthorized keystrokes include keystrokes not included in an expected combination of keystrokes associated with the first string of characters; and
   providing access to the client computing device upon authenticating the first and second strings of characters and determining that no unauthorized keystrokes are included in the plurality of keystrokes.

10. The method of claim 9, wherein the plurality of keystroke is detected using Javascript.

11. The method of claim 9, further comprising:
    determining a cadence of the plurality of keystrokes; and
    determining that the cadence of the plurality of keystrokes is above a predetermined threshold cadence,
    wherein access is provided to the client computing device further upon determining that the cadence of the plurality of keystrokes is above the predetermined threshold cadence.

12. The method of claim 9, further comprising:
    measuring a time of completion of the plurality of keystrokes; and
    determining that the time of completion of the plurality of keystrokes is below a predetermined threshold time of completion,
    wherein access is provided to the client computing device further upon determining that the time of completion of the plurality of keystrokes is below the predetermined threshold time of completion.

13. The method of claim 9, wherein a list of the unauthorized keystrokes is maintained in a database.

14. The method of claim 13, wherein the unauthorized keystrokes are determined based on historical data of an account associated with the username and password.

15. The method of claim 14, wherein the historical data of the account associated with the username and password provide an indication of a type of input device that is associated with the account,
    wherein the unauthorized keystrokes are further determined based on the type of input device.

16. A non-transitory machine-readable medium having stored thereon machine-readable instructions executable to cause performance of operations comprising:
    providing for display on a client computing device a visual representation of a first string of characters;
    detecting, in response to the providing the visual representation for display, a plurality of keystrokes on the client computing device that produces a second string of characters;
    determining that the second string of characters matches the first string of characters;
    determining that no unauthorized keystrokes are included in the plurality of keystrokes based at least in part on keystroke data including a code associated with each keystroke of the plurality of keystrokes, wherein the unauthorized keystrokes include keystrokes not included in an expected combination of keystrokes associated with the first string of characters; and
    providing access to the client computing device upon determining that the second string of characters matches the first string of characters and determining that no unauthorized keystrokes are included in the plurality of keystrokes.

17. The non-transitory machine-readable medium of claim 16, wherein the first string of characters is generated based on an expectation of an input device on the client computing device.

18. The non-transitory machine-readable medium of claim 16, wherein the operations further comprise:
    determining a cadence of the plurality of keystrokes; and
    determining that the cadence of the plurality of keystrokes is above a predetermined threshold cadence,
    wherein access is provided to the client computing device further upon determining that the cadence of the plurality of keystrokes is above the predetermined threshold cadence.

19. The non-transitory machine-readable medium of claim 16, wherein the operations further comprise:
    measuring a time of completion of the plurality of keystrokes; and
    determining that the time of completion of the plurality of keystrokes is below a predetermined threshold time of completion,
    wherein access is provided to the client computing device further upon determining that the time of completion of the plurality of keystrokes is below the predetermined threshold time of completion.

20. The non-transitory machine-readable medium of claim 16, wherein a list of the unauthorized keystrokes is maintained in a database, and wherein the unauthorized keystrokes are determined for one of an ISO keyboard or an ANSI keyboard.

* * * * *